United States Patent
Nishimura et al.

(10) Patent No.: US 7,241,534 B2
(45) Date of Patent: Jul. 10, 2007

(54) LITHIUM POLYMER SECONDARY CELL

(75) Inventors: Naoto Nishimura, Kashihara (JP); Masako Kitagawa, Tenri (JP); Motoaki Nishijima, Nara (JP); Naoto Torata, Kashihara (JP); Koichi Ui, Nagareyama (JP)

(73) Assignee: Sharp Kabushiki Kaisha, Osaka (JP)

( * ) Notice: Subject to any disclaimer, the term of this patent is extended or adjusted under 35 U.S.C. 154(b) by 527 days.

(21) Appl. No.: 10/474,333

(22) PCT Filed: Apr. 11, 2002

(86) PCT No.: PCT/JP02/03638

§ 371 (c)(1),
(2), (4) Date: Feb. 24, 2004

(87) PCT Pub. No.: WO02/084775

PCT Pub. Date: Oct. 24, 2002

(65) Prior Publication Data
US 2004/0126668 A1 Jul. 1, 2004

(30) Foreign Application Priority Data
Apr. 13, 2001 (JP) ............... 2001-114742

(51) Int. Cl.
*H01M 10/40* (2006.01)
*H01M 4/58* (2006.01)

(52) U.S. Cl. .................. 429/307; 429/317; 429/231.1; 429/231.8

(58) Field of Classification Search ................ 429/307, 429/311, 317, 231.1, 231.8, 223, 224
See application file for complete search history.

(56) References Cited

U.S. PATENT DOCUMENTS 6,132,906 A 10/2000 Nishimura et al. ......... 429/326

FOREIGN PATENT DOCUMENTS

| EP | 0 713 256 | 5/1996 |
|---|---|---|
| EP | 0 924 789 | 6/1999 |
| JP | 6-223842 | 8/1991 |
| JP | 5-025353 | 2/1993 |
| JP | 8-283523 | 10/1996 |
| JP | 09-97617 | * 4/1997 |
| JP | 10-218913 | 8/1998 |

(Continued)

OTHER PUBLICATIONS

Computer-generated translation of JP-11-96,832 (Kamiya et al.), obtained from the Japanese Patent Office website (doc date Apr. 1999).*

(Continued)

*Primary Examiner*—Stephen J. Kalafut
(74) *Attorney, Agent, or Firm*—Nixon & Vanderhye P.C.

(57) ABSTRACT

A lithium polymer secondary battery comprising: a negative electrode including a carbonaceous material, as an active material, obtainable by attaching or covering an amorphous carbon on the surface of graphite particle; an electrolyte layer; and a positive electrode having at least a metal oxide containing lithium as an active material, wherein the electrolyte layer comprising: a polymer containing a unit derived from vinylene carbonate; an organic solvent; and lithium salt.

8 Claims, 2 Drawing Sheets

FOREIGN PATENT DOCUMENTS

| | | |
|---|---|---|
| JP | 10-223044 | 8/1998 |
| JP | 10-334945 | 12/1998 |
| JP | 11-054123 | 2/1999 |
| JP | 11-096832 | 4/1999 |
| JP | 11-111265 | 4/1999 |
| JP | 11-176469 | 7/1999 |
| WO | 98/54779 A1 | 12/1998 |

OTHER PUBLICATIONS

Computer-generated translation of JP-10-334,945 (Nakamura et al.), obtained from the Japanese Patent Office website (doc date Apr. 1998).*

Computer-generated translation of JP-11-111,265 (Kazuhara et al.), obtained from the Japanese Patent Office website (doc date Apr. 1999).*

International Preliminary Examination Report mailed Oct. 15, 2003 in corresponding PCT Application No. PCT/JP02/03638.

* cited by examiner

LITHIUM POLYMER SECONDARY CELL

This application is the U.S. national phase of international application PCT/JP02/03638, filed Apr. 11, 2002, which designated the U.S.

TECHNICAL FIELD

The present invention relates to a lithium polymer secondary battery. More particularly, the present invention relates to a lithium polymer secondary battery, containing: a negative electrode including a carbonaceous material, as an active material, obtainable by attaching or covering an amorphous carbon on the surface of a graphite particle; and an electrolyte layer containing a polymer including vinylene carbonate, an organic solvent and a lithium salt, and having excellent initial and cycle characteristics.

PRIOR ART

A lithium secondary battery has a very high theoretical energy density as compared with other batteries and can realize reduction in size and weight thereof; therefore, much of an effort has been devoted to research and development thereof as a power supply of portable electronic devices. Further reduction in size and weight, however, has been increasingly demanded along with a progress toward a high performance of portable electronic device. Besides, in devices such as a portable telephone, reliability and safety thereof have been sought over many times of repetition of charge and discharge cycles.

Since in the lithium secondary battery, an electrolytic solution obtained by dissolving a lithium salt into an organic solvent has been traditionally used as an electrolyte between the positive electrode and the negative electrode, a can made of iron or aluminum has been used as a packaging material in order to maintain reliability against liquid leakage or the like. Therefore, further reduction in weight and thickness of the lithium secondary battery is obstructed by a weight and thickness of a metal can, which is the packaging material.

In order to eliminate such an obstruction, enthusiastic development is currently performed of a lithium polymer secondary battery employing no liquid as an electrolyte. Since such the battery includes an electrolyte in the solid state, it is made possible to seal the battery with ease, and furthermore to use a very light and thin material as the packaging material such as an aluminum laminate film, thereby enabling further reduction in weight and thickness of a battery.

The lithium polymer secondary battery is a battery including a lithium ion conducting polymer or a lithium ion conducting gel as an electrolyte. Proposals have been made on the lithium polymer secondary battery using the lithium ion conducting polymer including no organic solvent. For example, according to Japanese Unexamined Patent Publication No. HEI 6(1994)-223842, a proposal is made that by radically polymerizing a vinylene carbonate based monomer, there can be produced the lithium ion conducting polymer including no organic solvent, the polymer having a higher ionic conductivity as compared with other lithium ion conducting polymers. In addition, according to Japanese Unexamined Patent Publication No. HEI 5(1993)-25353, a proposal is made that a solid electrolyte obtained by the incorporating inorganic salt into a copolymer of an ester compound having a polymethoxyoxyalkylene chain and vinylene carbonate shows higher ionic conductivity as compared with other ion conducting polymers.

The proposed lithium ion conducting polymers including no organic solvent, however, have not obtained sufficient ionic conductivity.

In consideration of such circumstances, a proposal has been made that an organic solvent is incorporated into the lithium ion conducting polymer to thereby acquire the lithium ion conducting polymer with the organic solvent higher in ionic conductivity than without the organic solvent. For example, according to Japanese Unexamined Patent Publication No. HEI 8(1996)-283523, a proposal is made that a lithium ion conducting gel including a vinylene carbonate based monomer, an organic solvent and a lithium salt is prepared to thereby realize further increase in ionic conductivity.

The lithium ion conducting gel including vinylene carbonate as a main component is not sufficient in liquid retentivity of an organic solvent and a content of a polymer component cannot be reduced to 18% or less, thereby having not obtained sufficient ionic conductivity.

Furthermore, it is disclosed in Japanese Unexamined Patent Publication No. HEI 10(1998)-223044 that a combination with a copolymer of a monomer having an acrylic acid ester at an end of its molecule and vinylene monomer shows high ionic conductivity and electrochemical stability, which can be applied to a secondary battery.

In a case where a graphite based material used in the negative electrode of a prior art lithium ion battery is applied to the secondary battery described above, a lithium ion conducting polymer cannot be sufficiently crosslinked because of deactivation of generated radicals caused by a carbonaceous material, leading to a problem of increase in degradation in cycle characteristic of the secondary battery.

A polymerization method in a case where lithium salt and an organic solvent, when required, are added into a monomer and then polymerized is, in most of cases, to use heat, or irradiation with visual light, ultraviolet, an electron beam or the like. In implementation of the method, a radical polymerization initiator is necessary to be added in order to ensure a high efficiency of the polymerization. The radical polymerization initiator, however, does not only polymerize a monomer, but also may react with a carbonaceous material of a negative electrode and a metal oxide containing lithium of a positive electrode, which are electrode active materials, leading to a problem of reduction in battery capacity, decrease in a charge and discharge cycle lifetime, exudation of an electrolytic solution and the like.

DISCLOSURE OF THE INVENTION

According to the present invention, it provides a lithium polymer secondary battery comprising: a negative electrode including a carbonaceous material, as an active material, obtainable by attaching or covering an amorphous carbon on the surface of a graphite particle; an electrolyte layer; and a positive electrode having at least a metal oxide containing lithium as an active material, wherein the electrolyte layer comprises a polymer containing a unit derived from vinylene carbonate; an organic solvent; and lithium salt.

According to the present invention, an improvement can be realized on reduction in discharge capacity and decrease in a charge and discharge cycle lifetime of the battery, by using the negative electrode including the carbonaceous material, as the active material, obtainable by attaching or covering an amorphous carbon on the surface of a graphite particle; and the electrolyte layer containing a polymer including the unit derived from a monomer of vinylene carbonate. This is inferred because vinylene carbonate is lower in molecular weight and higher in reactivity as compared with other monomers, so vinylene carbonate is harder to remain as a monomer in a battery. As a second reason inferred, vinylene carbonate does not only form the electrolyte layer, but also form a film reducing internal resistance of the battery at the interface between the carbonaceous material obtained by attaching or covering amorphous carbon on surfaces of graphite particles and the electrolyte layer.

In a case where a monomer is polymerized by exposure to ultraviolet radiation, the light is hard to reach down to the inside of pores present in the positive or negative electrode. Therefore, vinylene carbonate high in reactivity is effectively employed.

DESCRIPTION OF THE EMBODIMENTS FOR CARRYING OUT THE INVENTION

Figure 1:
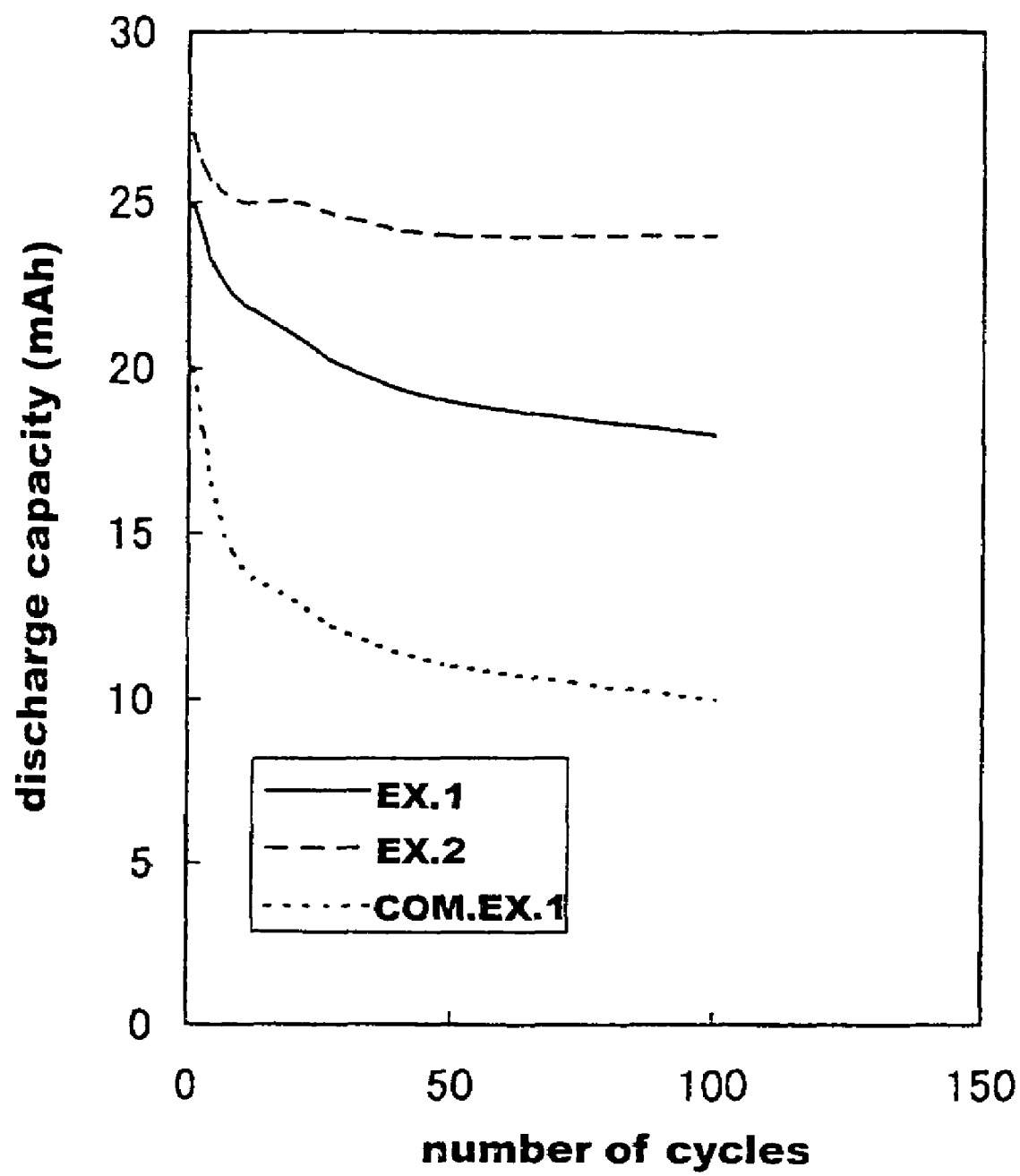
FIG. 1 is a graph shown changes in discharge capacities and number of cycles of charging and discharging of examples 1 and 2, and comparative Example 1.

A polymer to be used in the present invention can be obtained by polymerizing vinylene carbonate and a monomer copolymerizable therewith. It is preferable that a monomer component copolymerizable with vinylene carbonate has a polyether segment and a polymerization site thereof is polyfunctional so that a resultant polymer forms a three-dimensional crosslinked structure. A typical monomer of this kind is a monomer obtained by esterifying acrylic acid or methacrylic acid (hereinafter collectively referred to as "(meth)acrylic acid") with a terminal hydroxyl group of a polyether polyol. As is well known, the polyether polyol is obtained by addition polymerizing ethylene oxide alone or together with propylene oxide to a polyhydric alcohol, such as ethylene glycol, glycerin, trimethylol propane or the like as a starting material.

Polyfunctional polyether polyol poly(meth)acrylic acid ester can also be used, alone or in a copolymerized form in combination with monofucntional polyether polyol poly (meth)acrylate. Especially, trifunctional polyether polyol poly(meth)acrylic acid ester can be preferably used since it assumes a three-dimensional crosslinking structure with ease and is excellent in liquid retentivity of an electrolytic solution. For example, there can be preferably used trifunctional terminal (meth)acryloyl-modified alkylene oxide having a polymer chain expressed by the following general formula, which is disclosed in Japanese Unexamined Patent Publication No. HEI 5(1993)-109311:

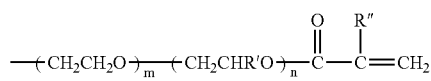

wherein R' indicates a lower alkyl group and R'' a hydrogen atom or a methyl group, provided that m or n is an integer 0 or 1 or more and that m+n≧35.

In the lithium polymer secondary battery of the present invention, a content of vinylene carbonate is preferably in the range of from 50 to 30 wt % relative to the total weight of monomers for obtaining a polymer contained in an electrolyte layer. More specifically vinylene carbonate may be used at a rate of 50 wt %, 45 wt %, 40 wt %, 35 wt % and 30 wt %. If the content of vinylene carbonate is used to be higher than 50 wt %, a polymerization reactivity is excessively high, which inhibits a segment motion of a polyether chain playing a role in ionic conductivity, unfavorably resulting in a higher internal resistance of the battery. On the other hand, if vinylene carbonate is used to be lower than 30 wt %, a residual monomer in the battery increases, unfavorably resulting in reduction in a discharge capacity and charge and discharge cycle lifetime of the battery.

As an organic solvent that may be used in a gel electrolyte, no specific limitation is placed on a particular solvent and any organic solvent can be used as far as it can be used in this field. Specifically, there are exemplified: cyclic carbonate esters such as ethylene carbonate (EC), propylene carbonate (PC) and the like; chain carbonate esters such as dimethyl carbonate (DMC), diethyl carbonate (DEC), ethylmethyl carbonate (EMC) and the like; lactones such as γ-butylolactone (GBL) and the like; esters such as methyl propionate, ethyl propionate and the like; ethers such as tetrahydrofuran and its derivatives, 1,4-dimethoxybutane, 1,3-dimethoxybutane, 1,3-dioxane, 1,2-dimethoxyethane, methyl diglyme and the like; nitriles such as acetonitrile, benzonitrile and the like, dioxolane and its derivatives; sulforane and its derivatives; and mixtures of thereof.

Since in the present invention, the carbonaceous material is used as the active material for the negative electrode, it is preferable to include at least EC low in decomposition of an eletrolytic solution and to further include at least GBL and/or EMC in order to improve a low temperature characteristic. Furthermore, it is especially preferable to add 1,4-dimethoxybutane and/or 1,3-dimethoxybutane in the range of from 2 to 5 wt % relative to the total weight of the organic solvent since polyether polyol (meth)acrylic acid ester and vinylene carbonate are good in compatibility therebetween to thereby enable a uniform gel electrolyte to be produced, additionally, with increased permeability thereof down to inside of pores of a porous electrode.

The lithium salt serving as a solute is not specifically limited to a particular one but any of lithium salts can be used as far as they can be used in this field. There can be used, to be concrete: $LiClO_4$, $LiBF_4$, $LiPF_6$, $LiCF_3SO_3$, $LiN(SO_2CF_3)_2$, $LiN(COCF_3)_2$, $LiC(SO_2CF_3)_3$ and mixtures thereof. A concentration of the lithium salt is preferably in the range of from 0.8 to 2.5 mol/l relative to the total volume of the organic solvent. If the salt concentration is lower than 0.8 mol/l, an ionic conductivity enough to attain a high load discharge characteristic of a battery cannot be obtained, while if the salt concentration is higher than 2.5 mol/l, it is unfavorably improper from the industrial viewpoint because of not only a high cost associated with the lithium salt but also a very long time required for dissolving the lithium salt.

A mixing ratio of a mixed monomer of polyether polyol (meth)acrylic acid ester and vinylene carbonate to an organic electrolytic solution obtained by dissolving the lithium salt into the organic solvent described above is a ratio at which it is sufficient for a mixture after polymerization to form an ion conducting gel electrolyte layer, for an organic electrolytic solution to form a continuous phase in the electrolyte layer and for the organic electrolytic solution not to separate and exude from the electrolyte as time elapses. This ratio is generally in the range of from 20/80 to 2/98 in ratio of monomer/electrolytic solution in weight. The ratio is more preferably in the range of from 15/85 to 2/98 in order to obtain a more sufficient ionic conductivity.

When a gel electrolyte of the present invention is formed by polymerization, known radical polymerization initiators can be used. Specifically, in a case where the gel electrolyte is prepared by irradiation with ultraviolet beam or visual light, the following photopolymerization initiators can be used, but no specific limitation is placed on the initiators. The initiators can be exemplified as follows: carbonyl compound initiators based on acetophenone, benzophenone, α-hydroxyketone, Michler's ketone, benzyl, benzoin, benzoin ether, benzyldimethyl ketal and the like.

Further, in a case where a gel electrolyte is prepared by heating, the following thermal polymerization initiators can be used, but no specific limitation is placed thereon. The initiators can be exemplified as follows: benzoyl peroxide (BPO), 2,2'-azobisisobutylonitrile (AIBN) and the like.

The battery of the present invention can be fabricated in procedures that the ion conducting gel electrolyte layer is formed on each of the negative and positive electrodes which are prepared in advance, and then both of the resultants are superposed on each other, alternatively a separator base material is placed between the negative and positive electrodes as prepared in advance, followed by injecting and polymerizing a solution obtained by mixing a monomer, an organic solvent and a lithium salt, together with a radical polymerization initiator. The fabrication procedures are not limited to the above.

In a case where the separator base material is adopted, preferable as base materials are a microporous film of polymer chemically stable in an organic electrolytic solution such as polypropylene, polyethylene, polyester and the like or a sheet (paper, non-woven fabric and the like) of fibers of a polymer described above. An air permeability of the base material is preferably in the range of from 1 to 500 sec/cm$^3$ since a strength enough to prevent a short circuit can be ensured in the battery while maintaining a low internal resistance therein.

As the carbonaceous material, which is a negative electrode active material used in the present invention, preferable is a material capable of electrochemical intercalation/deintercalation of lithium ion. Since a potential of intercalation/deintercalation of lithium ion is close to a potential of deposition/dissolution thereof, a high energy density battery can be constructed, which is especially preferable. A graphite particle on the surface of which amorphous carbon is attached or covered is used in order to cause a radical reaction for forming a lithium ion conducting polymer electrolyte to be effectively performed.

In the carbonaceous material of the present invention, it is preferable that some of pores having a relation to a value of a specific surface area measured by a BET method are closed to a certain extent by attachment or covering of amorphous carbon and that as a result, it has a porosity in the range of from 1 to 5 m$^2$/g in specific surface area. If a specific surface area is larger than this range, a contact area with the organic electrolytic solution obtained by dissolving the lithium salt into the organic solvent is also larger to thereby cause a decomposition reaction thereof with ease, which is not preferable. If a specific surface area is less than this range, a contact area with the electrolyte is also smaller to thereby slow an electrochemical reaction in speed and to degrade a load characteristic of the battery, which is not preferable.

Attachment or covering of amorphous carbon can be implemented in a procedure that the graphite particle is dipped into a coal heavy oil such as tar and pitch or a petroleum heavy oil such as a heavy oil and pulled therefrom, to heat the coated graphite particle to a carbonization temperature or higher and decompose a heavy oil and to pulverize the carbonaceous material if necessary. With such a procedure applied, decomposition reaction of the organic solvent and the lithium salt occurring on the negative electrode when charging is performed is significantly suppressed, therefore, a charge and discharge lifetime is improved and gas generation due to the decomposition reaction can be suppressed.

In the present invention, a metal oxide containing lithium can be used as a positive electrode active material. The metal oxide containing lithium is preferably selected as at least one from a composite oxide of a layer structure or a composite oxide containing a spinel structure expressed by $Li_a(A)_b(B)_cO_2$, wherein A indicates of one or more kinds of elements of transition metal elements and B is one or more kinds of elements selected from the group consisting of non-metallic elements of the groups IIIB, IVB and VB of the periodic table, semi-metallic elements, alkali earth metal elements and metallic elements such as Zn, Cu, Ti and the like, provided that a, b and c are $0<a\leq1.15$, $0.85\leq b+c\leq1.30$ and $0<c$, respectively.

As typical composite oxides, there are exemplified $LiCoO_2$, $LiNiO_2$, $LiMn_2O_4$ and $LiNi_{1-x}M_xO_2$, wherein M indicates an element of a transition metal, $LiCo_xNi_{1-x}O_2$, wherein ($0<x<1$) and others. In a case where any of the these composite oxides is used and the carbonaceous material is used as the active material for the negative electrode, a sufficiently practical operating voltage can be ensured even if there occurs a change in voltage (about 1 V vs. Li/Li$^+$) accompanying charging/discharging of the carbonaceous material itself. Furthermore, Li ions necessary for a charge/discharge reaction of a battery can exist in the battery in the form of, for example, $LiCoO_2$, $LiNiO_2$ or the like in advance prior to the fabrication as mentioned above.

The positive electrode and the negative electrode are prepared by basically forming the respective active material layer, obtained by fixing the respective active material with a binder, on metal foil serving as a collector. As materials of the metal foil serving as the corrector, there can be exemplified: aluminum, stainless, titanium, copper, nickel and the like, preferable are an aluminum foil for used in the positive electrode and a copper foil for use in the negative electrode in consideration of an electrochemical stability, ductility and economic efficiency.

Note that while in the present invention, the metal foil is mainly shown as a mode of the positive electrode and the negative electrode collector, there can be exemplified as other modes: a mesh, an expanded metal, a lath, a porous body, a resin film coated with an electronic conductive material, and the like, on which no specific limitation is imposed.

In combination with the active material in fabrication of the positive electrode or the negative electrode, there can be used, for improvement on electronic conductivity: chemically stable conductive materials such as graphite, carbon black, acetylene black, ketchen black, carbon fibers, conductive metal oxides and others when required.

The binder can also be used in fabrication of the positive electrode and the negative electrode when required. The binder in this case is selected from the group consisting thermoplastic resins, chemically stable and soluble in a proper solvent but not corroded by an organic electrolytic solution. There have been known many kinds of resins categorized therein and preferably used is, for example, polyvinylidene fluoride (PVDF), selectively soluble in N-methyl-2-pyrrolidone (NMP), which is an organic solvent, but stable in an organic electrolytic solution.

As other thermoplastic resins that can be used, there are exemplified: polymers or copolymers of acrylonitrile, methacrylonitrile, vinyl fluoride, chloroprene, vinylpyridine and its derivatives, vinylidene chloride, ethylene, propylene, and cyclodiene (for example, cyclopentadiene, 1,3-cyclohexadiene and the like). A solution may be replaced with a liquid dispersion of a binder resin.

The electrode can be prepared in a procedure that the active material and, when required, the conductive material are kneaded in the binder resin solution to produce paste and the paste is applied on the metal foil with a proper coater to a uniform thickness, followed by drying and thereafter, pressing. A content of the binder in the active material layer should be kept to the minimum necessary and is sufficiently in the general range of from 1 to 15 parts by wt relative to a total weight of the active material. In a case where the conductive material is used, a content of the conductive material is in the general range of from 2 to 15 parts by wt relative to a total weight of the active material.

The electrode thus prepared is in a single piece integrated with the ion conducting gel electrolyte layer and the electrode active layer, wherein the ion conducting gel layer is obtained by impregnating the ion conducting polymer matrix with an organic electrolytic solution containing the lithium salt or causing the organic electrolytic solution to be retained in the polymer matrix. Such the layer is macroscopically in a solid state, while the lithium salt solution microscopically forms a continuous phase and shows an ionic conductivity higher than an ion conducting polymer electrolyte without using a solvent therein. The ion conducting gel electrolyte layer is prepared by polymerizing thermally or photochemically a monomer of the polymer matrix in a mixed state with a lithium salt containing organic electrolytic solution.

A thus fabricated battery can be enclosed with a cylindrical can or a rectangular prismatic can made of iron and plated with nickel thereon, or made of aluminum; or with a film obtained by laminating resin on an aluminum foil, as packaging material, on which no specific limitation is imposed.

EXAMPLES

The following examples are presented only for the purpose of illustration of the present invention, without intention of any limitation on the scope of the present invention.

Example 1

A battery of Example 1 was fabricated according to the following process.

a) Preparation of Negative Electrode

One hundred parts by wt of carbonaceous material powder (with an average particle diameter of 12 μm and a specific surface area of 2 $m^2$/g) on surfaces of graphite particles of which amorphous carbon was attached or covered and a binder PVDF were mixed together at a weight ratio of 100:9, NMP as a solvent was added to the mixture at a proper amount and NMP and the mixture were kneaded into a negative electrode material paste. The negative electrode material paste was applied on a Cu foil of 18 μm in thickness and subjected to drying and thereafter, pressing to obtain a negative electrode sheet. The negative electrode sheet was cut into a square piece of 30×30 mm in size, to which piece a Ni collecting tab was welded to obtain a negative electrode. Note that the carbonaceous material powder on surfaces of graphite particles of which amorphous carbon was attached or covered was prepared in the following way: 50 g of an artificial graphite in a lump state with parameters of central particle diameter $D_{50}$=7.5 μm, a particle size distribution ranging from 0.1 to 150 μm, $d_{002}$=0.336 nm, Lc=100 nm, La=97 nm, a specific surface area of 10.5 $m^2$/g, R value=0.26 and a true specific gravity=2.25 $g/cm^2$ and 100 g of coal tar pitch, from which a primary quinoline insoluble matter was removed in advance (after the removal, including a trace of a quinoline insoluble matter and 30% of a toluene insoluble matter), of a softening temperature of 80° C. was put into a 500 ml separable flask, and mixed while agitating at 200° C. under ordinary pressure for 2 hours to obtain crude pitch coated graphite. One part by wt of toluene was added to one part by wt of the resulted crude pitch coated graphite, the graphite was cleaned while agitating at 80° C. for 1 hour and thereafter, the mixture was filtrated to thereby obtain refined pitch coated graphite. A central diameter $D_{50}$ of the refined pitch coated graphite was measured to be 7.7 μm. A central diameter $D_{50}$ of the graphite as core materials was 7.5 μm, and therefore, a thickness of a pitch layer was 0.1 μm.

b) Formation of Negative Electrode Gel Electrolyte Layer $LiBF_4$ was dissolved into a mixed solution of EC, GBL and EMC at a volume ratio of 1:1:1 so as to attain a concentration of $LiBF_4$ at 1.5 mol/l to prepare an organic electrolytic solution. Five wt % of trifunctional polyether polyol acrylic acid ester with a molecular weight of 7500 to 9000 and 3 wt % of vinylene carbonate were mixed into 92 wt % of the organic electrolytic solution and furthermore, 1000 ppm of 2,2-dimethoxy-2-phenylacetophenone as a photopolymerization initiator was further added into the solution to prepare a precursor solution.

Then, the negative electrode obtained in the process a) and a polyethylene porous film (with a thickness of 25 μm and an air permeability of 380 sec/$cm^3$) as a separator base were impregnated with the precursor solution.

The separator base impregnated with the same precursor solution was stacked on the negative electrode impregnated with the precursor solution described above and a stack of the two layers was illuminated with ultraviolet with a wavelength of 365 nm and an intensity of 30 mW/$cm^2$ for 3 min, thereby forming a gel electrolyte layer integrated with the negative electrode.

c) Preparation of Positive Electrode

One hundred part by wt of $LiCoO_2$ with an average particle diameter of 7 μm, 5 parts by wt of acetylene black, which is a conductive material, and 5 parts by wt of a binder PVDF were mixed together and thereafter a proper amount of NMP as a solvent was added to the mixture to knead and thereby obtain a positive electrode material paste. The positive electrode material paste is applied on an Al foil with a thickness of 20 mm and dried and then pressed to thereby obtain a positive electrode sheet. The positive electrode sheet was cut into a square piece of 30×30 mm in size and an Al collecting tab was welded to the square piece to obtain a positive electrode.

d) Formation of Positive Electrode Gel Electrolyte Layer

The precursor solution used for the negative electrode was used for the positive electrode. The positive electrode obtained in the process b) was impregnated with the solution and the positive electrode was illuminated from above with ultraviolet beam with a wavelength of 365 nm and an intensity of 30 mW/$cm^2$ for 3 min, thereby forming a gel electrolytic solution integrated with the positive electrode.

e) Assembling of Battery

The negative electrode and the positive electrode which were respectively integrated with the gel electrolyte layers obtained above were stuck to each other with the gel electrolyte layers for both the electrodes inward facing each other and were sealed with an Al laminated resin film to complete a battery.

Example 2

A battery of Example 2 was fabricated according to the following process.

a) Preparation of Negative Electrode

One hundred parts by wt of carbonaceous material powder (with an average particle diameter of 12 μm and a specific surface area of 2 m$^2$/g) on surfaces of graphite particles of which amorphous carbon was attached and a binder PVDF were mixed together at a weight ratio of 100:9, NMP as a solvent was added to the mixture at a proper amount and NMP and the mixture were kneaded into a negative electrode material paste. The negative electrode material paste was applied on a Cu foil of 18 μm in thickness and subjected to drying and thereafter, pressing to obtain a negative electrode sheet.

The negative electrode sheet was cut into a square piece of 30×30 mm in size, to which piece a Ni current collecting tab was welded to obtain a negative electrode.

b) Formation of Negative Electrode Gel Electrolyte Layer

LiBF$_4$ was dissolved into a mixed solution of EC and GBL at a volume ratio of 3:7 so as to attain a concentration of LiBF$_4$ at 1.8 mol/l to prepare an organic electrolytic solution.

2.5 wt % of trifunctional polyether polyol acrylic acid ester with a molecular weight of 7500 to 9000, 0.5 wt % of monofunctional polyether polyol acrylic acid ester with a molecular weight of 2500 to 3000 and 2 wt % of vinylene carbonate were mixed into 95 wt % of the organic electrolytic solution and furthermore, 1000 ppm of 2,2-dimethoxy-2-phenylacetophenone as a photopolymerization initiator was added into the solution to prepare a precursor solution.

Then, the negative electrode obtained in the process a) and a non-woven polyester fabric (with a thickness of 20 μm and an air permeability of 180 sec/cm$^3$) as a separator base were impregnated with the precursor solution.

The separator base impregnated with the same precursor solution was stacked on the negative electrode impregnated with the precursor solution and a stack of the two layers was illuminated with ultraviolet with a wavelength of 365 nm and an intensity of 30 mW/cm$^2$ for 3 min, thereby forming a gel electrolyte layer integrated with the negative electrode.

c) Preparation of Positive Electrode

One hundred part by wt of LiNi$_{0.2}$Co$_{0.8}$O$_2$ with an average particle diameter of 7 μm, 5 parts by wt of acetylene black, which is a conductive material, and 5 parts by wt of a binder PVDF were mixed and thereafter a proper amount of NMP as a solvent was added to the mixture to knead and thereby obtain a positive electrode material paste. The positive electrode material paste is applied on an Al foil with a thickness of 20 mm and dried and then pressed to thereby obtain a positive electrode sheet.

The positive electrode sheet was cut into a square piece of 30×30 mm in size and an Al collecting tab was welded to the square piece to obtain a positive electrode.

d) Formation of Positive Electrode Gel Electrolyte Layer

The precursor solution used for the negative electrode was used for the positive electrode. The positive electrode obtained in the process b) was impregnated with the solution and the positive electrode was illuminated from above with ultraviolet with a wavelength of 365 nm and an intensity of 30 mW/cm$^2$ for 3 min, thereby forming a gel electrolyte layer integrated with the positive electrode.

e) Assembling of Battery

The negative electrode and the positive electrode, respectively, integrated with the gel electrolyte layers obtained above, were stuck to each other with the gel electrolyte layers of both electrodes inward facing each other and were sealed with an Al laminated resin film to complete a battery.

Comparative Example 1

A battery of Comparative Example 1 was fabricated in a similar manner to Example 1 with the exception that there was used carbonaceous material powder of the process a) of Example 1 (with an average particle diameter of 12 μm and a specific surface area of 2 m$^2$/g) on surfaces of graphite particles of which amorphous carbon were attached and the process b) was performed in the following way.

LiBF$_4$ was dissolved into a mixed solution of EC, GBL and EMC at a volume ratio of 1:1:1 so as to attain a concentration of LiBF$_4$ at 1.5 mol/l to prepare an organic electrolytic solution.

Five wt % of trifunctional polyether polyol acrylic acid ester with a molecular weight of 7500 to 9000 was mixed into 95 wt % of the organic electrolytic solution and furthermore, 1000 ppm of 2,2-dimethoxy-2-phenylacetophenone as a photopolymerization initiator was added into the solution to prepare a precursor solution.

Then, the negative electrode obtained in the process a) and a polyethylene porous film (with a thickness of 25 μm and an air permeability of 380 sec/cm$^3$) as a separator base were impregnated with the precursor solution.

The separator base impregnated with the same precursor solution was stacked on the negative electrode impregnated with the precursor solution and a stack of the two layers was illuminated with ultraviolet with a wavelength of 365 nm and an intensity of 30 mW/cm$^2$ for 3 min, thereby forming a gel electrolyte layer integrated with the negative electrode.

The batteries of Examples 1 and 2, and Comparative Example 1 were charged till a battery voltage reached 4.1 V at a constant current value of 2.5 mA and after the battery voltage reaches 4.1 V, charging was continued till the charging time of 12 hours elapsed at the constant voltage. Discharging was performed at a constant current value of 5 mA till the battery voltage fell down to 2.75 V. Charge and discharge capacities, and efficiencies in a first cycle in this case are compiled in Table 1. In FIG. 1, there is shown a change in discharge capacity when charging and discharging were performed under the same conditions till the number of cycles of charging and discharging reached 100.

TABLE 1

|  | Charge capacities (mAh) | Discharge capacities (mAh) | Charge and discharge efficiencies (%) |
|---|---|---|---|
| Example 1 | 31 | 25 | 80.6 |
| Example 2 | 32 | 27 | 84.4 |
| Comparative Example 1 | 33 | 20 | 60.6 |

As is understood from Table 1, a discharge capacity and a charge and discharge efficiency in the first cycle of the battery of Comparative Example 1 is greatly lower as compared with those of Examples 1 and 2. This is because in Comparative Example 1, there is used neither vinylene carbonate with high polymerization (crosslinking) reactivity nor a carbonaceous material powder on surfaces of graphite particles of which amorphous carbon was attached, as the negative electrode active material, therefore, the photopolymerization initiator was consumed in an electrode active material and in turn, much of a residual monomer was left unpolymerized in the battery of Comparative Example 1. Furthermore, as is understood from FIG. 1, a charge and discharge cycle lifetime of the battery of Comparative Example 1 is also shortened under an influence of the residual monomer.

Example 3

A battery of Example 3 was fabricated according to the following process.

a) Preparation of Negative Electrode

One hundred parts by wt of carbonaceous material powder (with an average particle diameter of 12 μm and a specific surface area of 2 $m^2/g$) on surfaces of graphite particles of which amorphous carbon was attached and a binder PVDF were mixed together at a weight ratio of 100:9, NMP as a solvent was added to the mixture at a proper amount and NMP and the mixture were kneaded into a negative electrode material paste. The negative electrode material paste was applied on a Cu foil of 18 μm in thickness and subjected to drying and thereafter, pressing to obtain a negative electrode sheet.

The negative electrode sheet was cut into a square piece of 30×30 mm in size, to which piece a Ni collecting tab was welded to obtain a negative electrode.

b) Preparation of Positive Electrode

One hundred parts by wt of $LiMn_2O_4$ with an average particle diameter of 7 μm, 5 parts by wt of acetylene black, which is a conductive material, and 5 parts by wt of a binder PVDF were mixed together and thereafter a proper amount of NMP as a solvent was added to the mixture to knead and thereby obtain a positive electrode material paste. The positive electrode material paste is applied on an Al foil with a thickness of 20 mm and dried and then pressed to thereby obtain a positive electrode sheet. The positive electrode sheet was cut into a square piece of 30×30 mm in size and an Al collecting tab was welded to the square piece to obtain a positive electrode.

c) Preparation of Precursor Solution for Gel Electrolyte $LiPF_6$ was dissolved into a mixed solution of EC, GBL and 1,4-dimethoxybutane at a volume ratio of 30:65:5 so as to attain a concentration of $LiPF_6$ at 2 mol/l to prepare an organic electrolytic solution.

3.5 wt % of trifunctional polyether polyol acrylic acid ester with a molecular weight of 7500 to 9000, 2.5 wt % of monofunctional polyether polyol acrylic acid ester with a molecular weight of 220 to 300 and 4 wt % of vinylene carbonate were mixed into 90 wt % of the organic electrolytic solution and furthermore, 0.5 wt % of BPO as a thermal polymerization initiator was added into the solution to prepare a precursor solution.

d) Assembling of Battery

A non-woven polyester fabric (with a thickness of 20 μm and an air permeability of 180 $sec/cm^3$) was sandwiched between the negative electrode and the positive electrode prepared in the processes described above and the fabric sandwiched between the electrodes was sheathed into a bag made of Al laminated resin film, which is a sheathing material, to inject the precursor solution prepared in the process c) into the bag, followed by sealing. Then, the bag was heat-treated for 72 hours at 80° C. to complete a battery.

Comparative Example 2

A battery of Comparative Example 2 was completed in a similar manner to Example 3 with the exception that the process c) in Example 3 was performed in the following way.

$LiPF_6$ was dissolved into a mixed solution of EC and GBL at a volume ratio of 30:70 so as to attain a concentration of $LiPF_6$ at 2 mol/l to prepare an organic electrolytic solution.

2.5 wt % of trifunctional polyether polyol acrylic acid ester with a molecular weight of 7500 to 9000, 1.5 wt % of monofunctional polyether polyol acrylic acid ester with a molecular weight of 220 to 300 and 6 wt % of vinylene carbonate were mixed into 90 wt % of the organic electrolytic solution and furthermore, 0.5 wt % of BPO as a thermal polymerization initiator was added into the solution to prepare a precursor solution.

Figure 2:
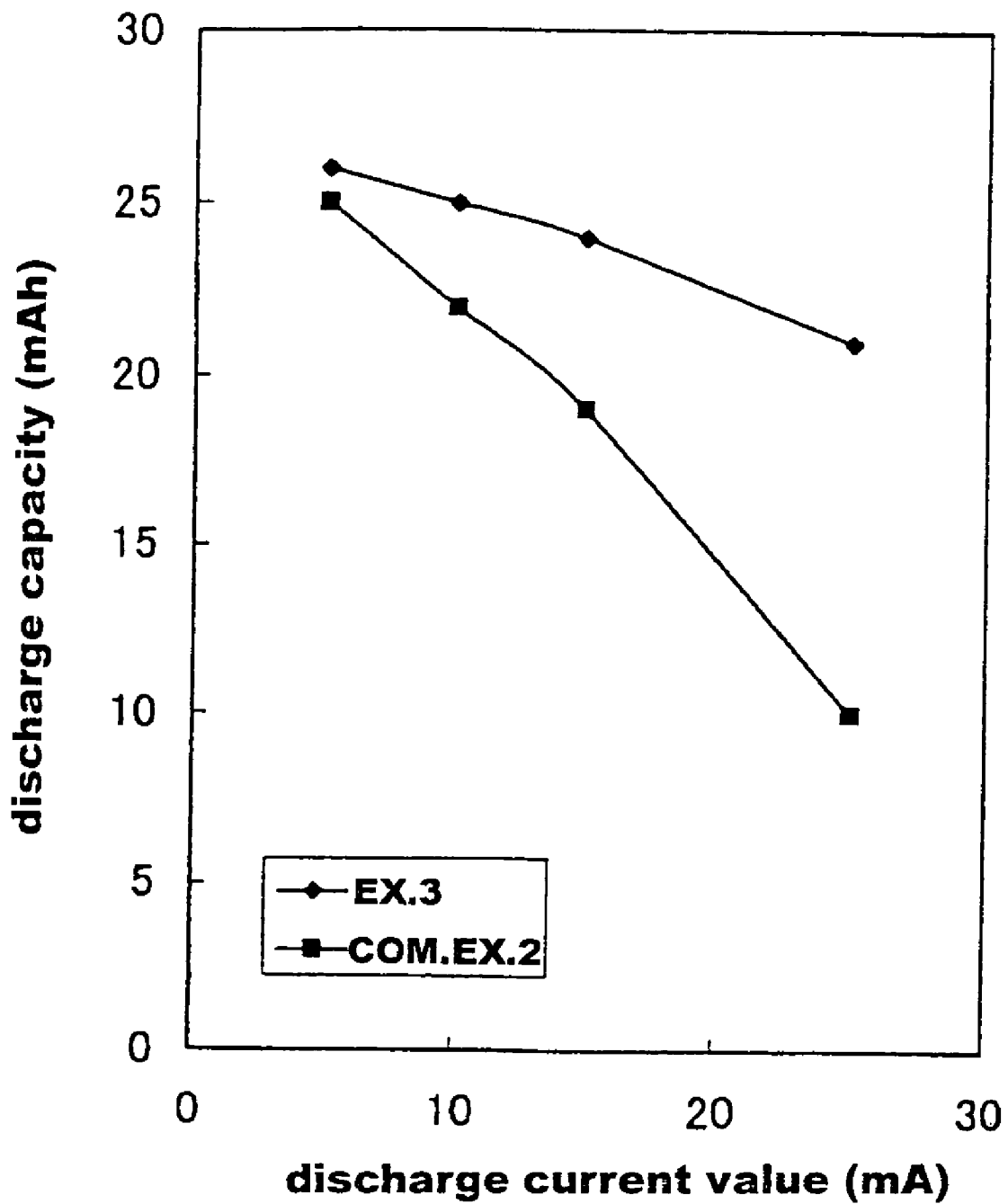
FIG. 2 is a graph shown relations between discharge capacities and discharge current values of example 3 and comparative Example 3.

The batteries of Example 3 and Comparative Example 2 were charged till a battery voltage reached 4.1 V at a constant current value of 2.5 mA in each cycle and after the battery voltage reaches 4.1 V, charging was continued till the charging time of 12 hours elapsed at the constant voltage. Discharging was performed at each constant current value of 5 mA, 10 mA, 15 mA and 25 mA till the battery voltage fell down to 2.75 V. In FIG. 2, there is shown changes in discharge capacity when discharging was performed at respective discharge current values.

As is understood from FIG. 2, in the battery of Comparative Example 2, a weight ratio of a crosslinked polymer and vinylene carbonate is 40:60 and if a content of vinylene carbonate exceeds the weight ratio of 50:50, a polymerization (crosslinking) reactivity is excessively high to raise an internal resistance of a battery and to degrade a discharge characteristic under a high load. Furthermore, it is found that there exists an effect of reduction in internal resistance of a battery due to addition of 1,4-dimethoxybutane.

Examples 4 to 7 and Comparative Examples 3 and 4

Weight ratios of the organic electrolytic solution prepared in the process b) of Example 1: trifunctional monomer: vinylene carbonate were prepared as shown in Table 2, batteries were fabricated in Examples 4 to 7 and Comparative Examples 3 and 4 and discharge capacities of the batteries at a discharge current value of 25 mA are collectively shown in Table 2.

TABLE 2

| | Composition of gel electrolyte (wt %) | | | Discharge capacities |
| --- | --- | --- | --- | --- |
| | Organic electrolytic solution | Trifunctional monomer | Vinylene carbonate | at current value of 25 mA (mAh) |
| Example 4 | 98 | 1.5 | 0.5 | 20 |
| Example 5 | 95 | 2.5 | 2.5 | 20 |
| Example 6 | 90 | 7 | 3 | 19 |
| Example 7 | 85 | 10 | 5 | 18 |
| Comparative Example 3 | 83 | 10 | 7 | 11 |
| Comparative Example 4 | 70 | 20 | 10 | 8 |

It is also found from Table 2 that an excellent high load discharge characteristic is shown in a battery including a gel electrolyte retaining an organic electrolytic solution more than 85:15 in weight ratio of the organic electrolytic solution: a combination of trifunctional monomer and vinylene carbonate.

According to the present invention, there can be provided a lithium polymer secondary battery having improved initial and cycle characteristics. Furthermore, in a case where a crosslinked polymer includes a polymer or a copolymer of a trifunctional polyether polyol (meth)acrylic acid ester containing an ethylene oxide (EO) unit alone or both of an EO unit and a propylene oxide (PO) unit in a polymer chain, there can be provided a high reliability lithium polymer secondary battery excellent in liquid retentivity and free of liquid leakage.

In addition, in a case where at least 1,3-dimethoxybutane and/or 1,4-dimethoxybutane is incorporated in an organic solvent in a gel electrolyte, improvement is ensured on permeability of an electrolyte into pores of a porous electrode, thereby enabling a lithium polymer secondary battery having an improved load characteristic to be provided.

What is claimed is:

1. A lithium polymer secondary battery comprising: a negative electrode including a carbonaceous material, as an active material, obtainable by attaching or covering an amorphous carbon on the surface of graphite particle; an electrolyte layer; and a positive electrode having at least a metal oxide containing lithium as an active material, wherein the electrolyte layer comprising: a polymer containing a unit derived from vinylene carbonate; an organic solvent; and lithium salt,
said polymer comprising a crosslinked polymer of the vinylene carbonate and a polyfunctional (meth)acrylic ester having a polyether segment to form a crosslinked structure.

2. A lithium polymer secondary battery according to claim 1, in which the polymer is obtained by polymerizing monomers containing vinylene carbonate in the range of from 50 to 30 wt % relative to a total weight of the monomers for obtaining the polymer.

3. A lithium polymer secondary battery according to claim 1, in which a weight ratio of the polymer in the electrolyte layer and the electrolytic solution obtained by dissolving the lithium salt in the organic solvent is in the range of from 15/85 to 2/98.

4. A lithium polymer secondary battery according to claim 1, in which the metal oxide containing lithium is $LiCoO_2$, $LiNiO_2$, $LiMn_2O_4$ or $LiNi_{1-x}M_xO_2$, wherein M indicates a transition metal element.

5. A lithium polymer secondary battery according to claim 1, in which the organic solvent is incorporated at least one 1,3-dimethoxybutane or 1,4-dimethoxybutane.

6. A lithium polymer secondary battery according to claim 1, in which the polymer comprises a crosslinked polymer of trifunctional polyol (meth)acrylic acid ester.

7. A lithium polymer secondary battery according to claim 1, in which the polymer is prepared by irradiation with ultraviolet beam in the presence of the positive electrode or the negative electrode.

8. A lithium polymer secondary battery according to claim 1, in which the specific surface area of the carbonaceous material is the range of from 1 to 5 $m^2/g$.

* * * * *